United States Patent
Huang et al.

[11] Patent Number: 5,993,726
[45] Date of Patent: Nov. 30, 1999

[54] MANUFACTURE OF COMPLEX SHAPED $CR_3C_2/AL_2O_3$ COMPONENTS BY INJECTION MOLDING TECHNIQUE

[75] Inventors: Jow-Lay Huang; Kuo-Chi Twu; Jiunn-Jye Huang, all of Tainan, Taiwan

[73] Assignee: National Science Council, Taiwan

[21] Appl. No.: 08/839,160

[22] Filed: Apr. 22, 1997

[51] Int. Cl.[6] .................................................. B28B 1/24
[52] U.S. Cl. .............................................. 264/642; 264/645
[58] Field of Search ..................................... 264/642, 645

[56] References Cited

U.S. PATENT DOCUMENTS 5,425,909   6/1995   Fu et al. ........................................ 264/44
5,484,629   1/1996   Ghosh et al. ................................. 427/255

*Primary Examiner*—Christopher A. Fiorilla
*Attorney, Agent, or Firm*—Smith, Gambrell & Russell, LLP

[57] ABSTRACT

The purpose of this invention is to manufacture complex shaped $Cr_3C_2/Al_2O_3$ components efficiently with effective cost. Chromium carbide, which is quite chemically inert at elevated temperature, is added into an alumina matrix for toughening purposes. Chromium carbide and alumina ceramic powders are mixed with binders to form a solidified suspension. The suspension is then crushed, heated, and injected into green products. Controlled solvent and thermal debinding processes are followed before performing pressureless sintering. Samples are sintered in pre-treated argon gas with minimum oxygen partial pressure, or in vacuum for controlling the phase stability and microstructure for tailoring mechanical properties. The processing parameters for injection molding, the composition design of binders and ceramic composites, and the techniques for controlling the phase transformation of chromium carbide are developed. A near-net shape complex component with minimum after machining can be manufactured. The injection molding and pressureless sintering process make the mass production possible. Optimized properties of 97.8% in the theoretical density, 500 Mpa in strength, and 5.85 $MPam^{1/2}$, are obtained. These properties are greater, in comparison, than the properties of conventional alumina ceramics.

6 Claims, 4 Drawing Sheets

MANUFACTURE OF COMPLEX SHAPED $CR_3C_2/AL_2O_3$ COMPONENTS BY INJECTION MOLDING TECHNIQUE

BACKGROUND OF THE INVENTION

1. Field of the Invention

The purpose of this invention is to manufacture complex shaped $Cr_3C_2/Al_2O_3$ components by an injection molding technique. Pressureless sintering or vacuum sintering is performed on the unsintered or green products to manufacture ceramic complex shaped components.

2. Cross-Reference to Related Application

Alumina has good physical and chemical properties and is currently the most widely used material for ceramics. But its inherent brittleness had lowered its dependability. In recent years, ceramic researchers had kept on improving its dependability. For example, a second phase strengthener can be added into the alumina base material which can greatly increase its toughness and improve its dependability. A second phase strengthner can include high hardness grains, bearded crystal, or plate grains. But recent research indicates that bearded crystal can cause cancer while plate grains have directional properties which should be considered and are not easy to process. Not only do the $Cr_3C_2/Al_2O_3$ grain strengtheners overcome the above drawbacks but they are also far more convenient and economical to process in comparison with the bearded crystal or plate grains.

Since the molded shape of structural ceramic was restricted and there was no way to expand scope of its application, the application of injection molding techniques can lower the cost of the molded shape, can make mass production possible, and can produce complex-shaped and high precision products. Thus, a vacuum and pressureless sintering process and injection molding were used in this disclosure to manufacture commercial precision ceramic components.

Adding chromium carbide in the alumina base can improve the alumina's inherent brittleness and improve its dependability. There is also no transformation in the interface of $Cr_3C_2/Al_2O_3$, and the addition of chromium carbide can simultaneously increase the strength and toughness of the resulting material, which is seldom seen in composite materials.

SUMMARY OF THE INVENTION

One purpose of this invention is to mix the chromium carbide and alumina ceramic powders to form a solidified suspension to generate phase transformation at elevated temperatures, hereby, tailoring the mechanical properties of the material. Vacuum and pressureless sintering are used in producing the products.

Another purpose is to manufacture complex shaped products by injection molding, which can lower the cost of processing and increase production at the same time, which is very suitable for mass production. This processing technique can be suitably applied to related nitrogen compounds or oxides.

Also, by using this technique to produce complex shaped ceramic components, vacuum sintering processing has the effect of controlling phase transformation of chromium carbide.

The process of manufacturing complex shaped ceramic components by-an injection molding technique, in this invention include:

1. Powder equipment: Chromium carbide is added into the alumina to form a mixed powder. After ball milling, the mixed powder is dried and sorted.
2. Powder and binder mixing and refining: The dried powder is mixed and refined with binder to form a solidified suspension.
3. Injection molding: The solidified suspension is crushed then manufactured into a formed product by injection molding.
4. Solvent degreasing: The formed green product is degreased and removed after cooling.
5. Thermal degreasing: The green product that underwent solvent degreasing is heated to degrease it.
6. Cold isostatic pressure (CIP) forming: The degreased green products are subjected to CIP forming and put in the drying oven to avoid residual moisture in the green product.
7. Pressureless sintering: The green products are sintered to control the phase transformation due to elevated temperatures.

BRIEF DESCRIPTION OF THE DRAWINGS

Table 1 is the relation of relative density with the temperature of pressureless sintering and percentage of chromium carbide Table 2 is the relation of flexural strength with the grain diameter of chromium carbide and volumetric percentage Table 3 is the relation of rupture toughness to the gas air inside the furnace and volumetric percentage of chromium carbide

| 1. Controller | 2. Graphite furnace |
| --- | --- |
| 3. Heater | 4. Copper wire |
| 5. Power supplier | 6. Argon gas cylinder |

Figure 2:
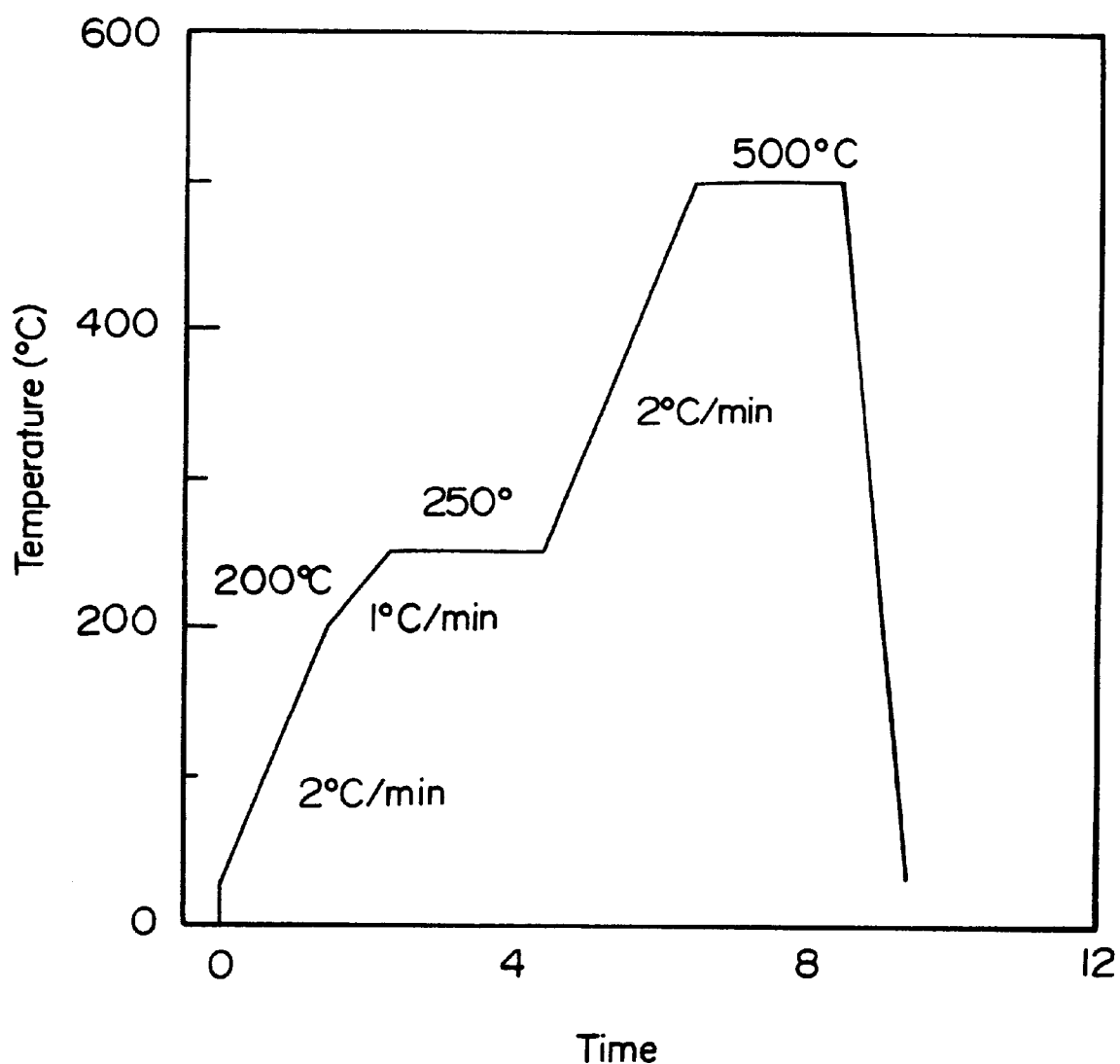

FIG. 2 is a heating-up diagram of curves of thermal degreasing

Figure 3:
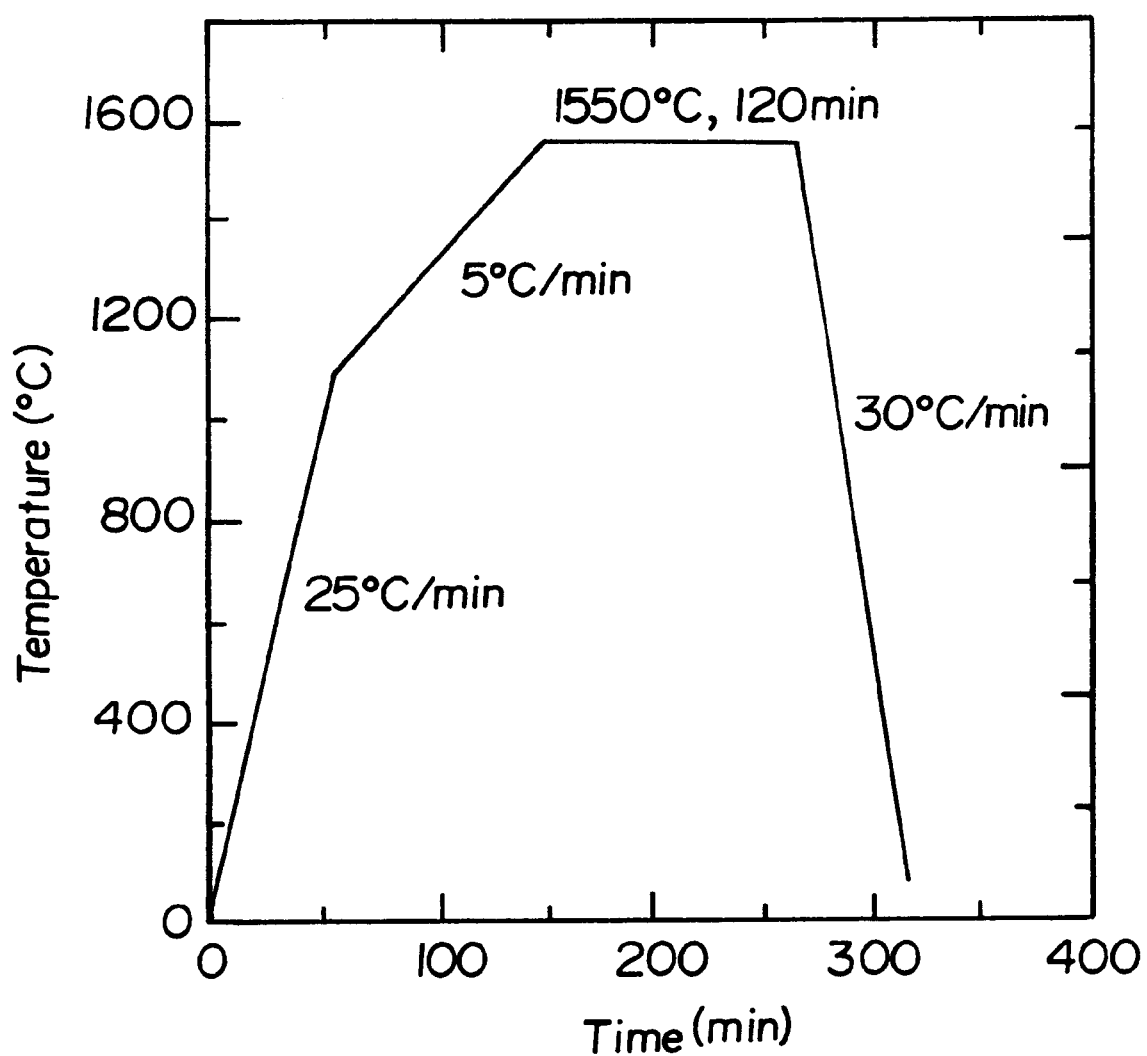

FIG. 3 is a heating-up diagram of curves during pressureless sintering

Figure 4A:
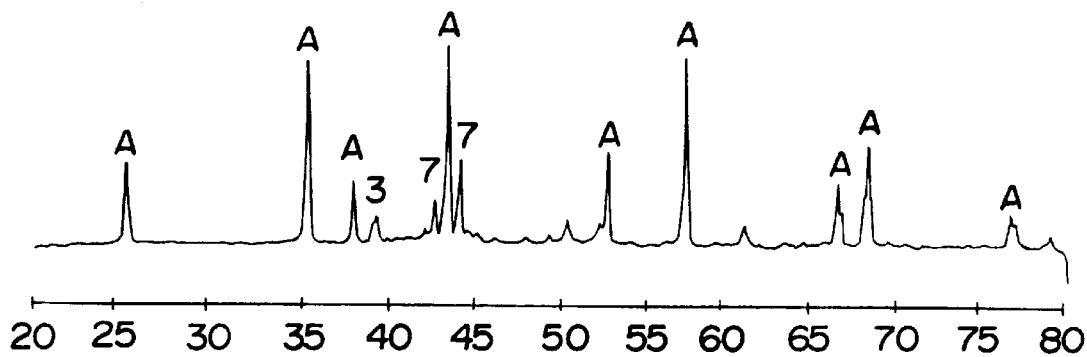
Figure 4B:
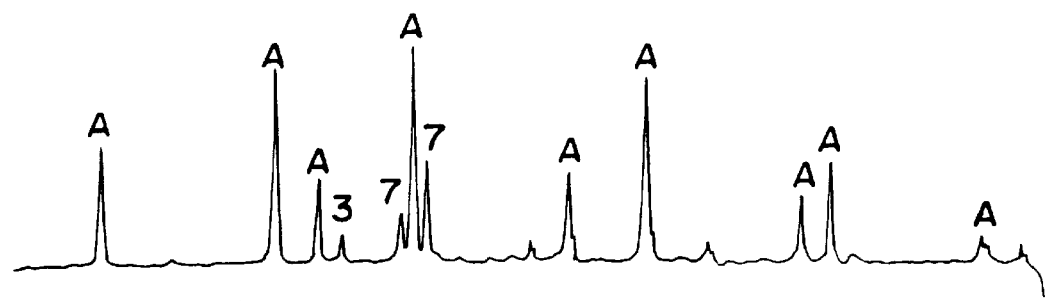
Figure 4C:
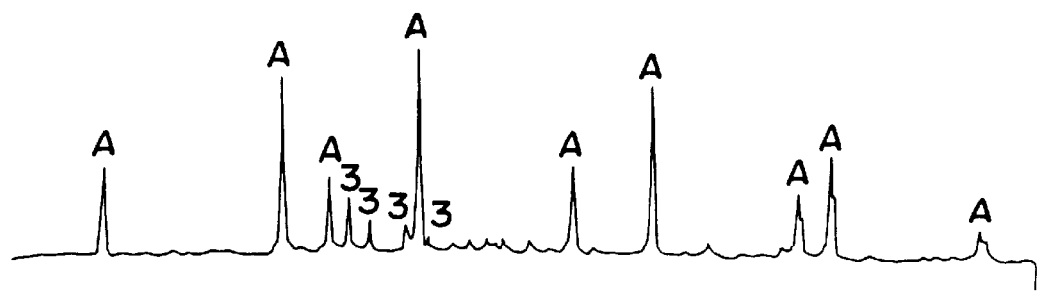

FIG. 4(a)–4(c) are X-Ray Analysis Diagrams (XRD) of sintered samples during pressureless sintering at 1450° C. to 1550° C. The results showed that argon gas which underwent heated copper plate treatment was able to successfully control the phase transformation of chromium carbide.

A: $Al_2O_3$  B: $Cr_3C_2$  C: $Cr_7C_3$ wherein FIG. 4(a) 1450° C. (Under argon atmosphere before copper plate heat treatment)

wherein FIG. 4(b) 1550° C. (Under argon atmosphere before copper plate heat treatment)

wherein FIG. 4(c) 1550° C. (Under argon atmosphere after copper plate heat treatment)

FIG. 5 is a diagram of complex-shaped finished products
  a. Newly injected green products
  b. Solvent degreased green products
  c. Thermal degreased green products
  d. Vacuum sintered specimen

DETAILED DESCRIPTION OF THE INVENTION

The process of manufacturing complex-shaped ceramic components by injection molding technique, in this invention includes:

1. Powder equipment: Adding-chromium carbide to the alumina to form a mixed powder, after ball milling, drying and sorting the mixed powder.

2. Powder and binder mixing and refining: Mixing and refining the dried powder with binder to form a solidified suspension.

3. Injection molding: Crushing the solidified suspension, then manufacturing it into a formed product by injection molding.

4. Solvent degreasing: Degreasing the formed green product. Removing said degreased green product after cooling.

5 Thermal degreasing: Heat the degreased green product to further degrease.

6. Cold isostatic pressure (CIP) forming:
Subjecting the degreased products to CIP forming and drying the degreased green product in the drying oven to avoid residual moisture in the green product.

7. Pressureless sintering: Sintering the green products to control phase transformation due to the elevated temperature.

There is no chemical transformation in the interface of chromium carbide ($Cr_3C_2$) and Alumina ($Al_2O_3$). Sintering can simultaneously increase the strength and toughness of the material as shown in Tables 3 and 4. It is known that the strength and toughness of alumina alone is 310MPa and 3.9pam$^{1/2}$ respectively. When chromium carbide was added, however, the strength and toughness increased to 485 MPa and 6.0Mpam½, respectively. The resulting sintered product is clearly superior, which superiority is seldom seen in composite materials. In this invention, chromium carbide is used as a strengthening phase and added into the base material of alumina. The mixture is manufactured into complex-shaped products by injection molding, then undergoes solvent degreasing and thermal degreasing, and then vacuum and pressureless sintering is performed on the green products. Table 1 explains the relationship of the relative density with the temperature of pressureless sintering and the percentage of chromium carbide. There is a maximum relative density when the sintering temperature is 1550° C. Treated highly purified argon sintering is used in the Examples. The effect of hot pure copper enables the minimum residual oxygen and copper to react and minimize oxygen partial pressure to control the phase transformation of chromium carbide. Compare (a), (b), and (c) in FIG. 4. There is no $Cr_7C_3$ phase in (c), hence, strength and toughness are lessened. It is discovered in this invention that in the vacuum sintering atmosphere, the phase transformation of chromium carbide can be controlled.

Not only can the processing technique used in this invention shorten the production time, but also the equipment is simple and economical.

In the past, pure alumina and silicon nitride were mainly among the most vastly researched materials used in the injection molding of ceramic materials. Most of the researchers discussed the method of degreasing and selection of binder (as per attached patent data). The difference in this invention, however, is the selection of alumina composite materials strengthened with chromium carbide grain. There is no transformation in their interface which increases the strength and toughness of the materials which was seldom seen in composite materials. Taking into account the oxidation of chromium carbide ($Cr_3C_2$) at elevated temperatures, argon gas is introduced into the furnace body to perform pressureless sintering and vacuum sintering in this invention in order to control phase transformation of chromium carbide ($Cr_3C_2$), which is great feature in this invention. Also, in this invention, pressureless sintering was used in manufacturing complex shaped materials instead of pressure sintering.

In this invention, chromium carbide is mixed into the alumina, using, for example, polypropylene, paraffin, and stearate as binders. These binders and powders are mixed to form suspensions. When these suspensions are above the melting point of the binders, they display a fluid behavior similar to that of plastic which can be used in injection molding to manufacture complex shaped green products. As for the green products with a powder and binder content, solvents such as normal hexane, normal ethane, normal heptane or normal octane can be used in dissolving the paraffin and stearate in the binder and be removed from the green products. After solvent degreasing, the green products undergo thermal degreasing, and due to thermal decomposition, the residual binders are formed into gas molecules. These gas molecules then escape through the powder grain pores so that the binders inside the green products are totally eliminated. Since solvent degreasing forms pore distribution in the green products, providing a proper diffusion path for gas decomposition is necessary. Hence, thermal degreasing time is greatly shortened and the generation of flaws is minimized.

There are three kinds of structural phases in chromium carbide: $Cr_3C_2$, $Cr_7C_3$, and $Cr_{23}C_6$. $Cr_3C_2$ phase is more unstable than the other two. It reacts easily with oxygen at high temperatures and decarbonates, even to the extent of oxidizing into chromium oxide r $Cr_7C_3$ phase, which will reduce the mechanical property of the composite material.

Since $Cr_3C_2$ easily reacts to oxygen resulting in $Cr_7C_3$, which reduces the mechanical property, the importance of gas air to $Cr_3C_2$ is demonstrated. Therefore, in this invention, after degreasing, two different methods are used in sintering green products. One is pressureless sintering, in which highly purified argon gas flowed inside the furnace. As the pure copper on the furnace pipeline is heated (to approximately 600° C.), a minimum of residual oxygen gas will pass in the furnace and react with pure copper and become cupric oxide. This can control $Cr_3C_2$ from generating an oxygen reaction resulting in $Cr_7C_3$ and reducing the mechanical property. The other method is vacuum sintering which also has the effect of controlling phase transformation of $Cr_3C_2$.

The optimum condition of "manufacturing complex shaped ceramic components by injection molding" in this invention include forming chromium carbide powder and alumina powder with a volumetric proportion of 10:90 to 40:60 into a mixed powder, using free polyproplylene, paraffin, and stearate (at least one kind) as binders. The quantity of binder can be 55–60 vol % of the above mentioned powder, and mixed with the powder to form suspensions, so that when these suspensions are above the melting point of the mentioned binders, they will display a fluid behavior similar to that of plastic. The conditions of injection molding include a heating temperature of 155-150-150° C. range of nozzle temperature of 160° C., a range of injection pressure of 500Kg/cm$^2$, and an injection speed of 40cc/sec. The above-mentioned powders and binders are injected into the green products to manufacture various complex shaped green products.

These green products are degreased in a baking oven at approximately 60° C. using at least one kind of solvent such as normal ethane, normal heptane, normal hexane, or normal octane, then taken out and put into a high temperature boiler. The boiler temperature is controlled at 600° C. for thermal degreasing, so that the binders in the green products will be completely stripped, forming an even pore distribution inside the green products. After degreasing, the green products undergo 100MPa cold identical pressure (CIP) to reduce the internal voids and increase the density of green products, then these green products are placed inside a bake oven while maintaining the temperature at approximately 100° C. to control the residual moisture in the green products. With a pipeline inside the high temperature boiler, the residual oxygen reacts with the copper and reduces the oxygen partial pressure to avoid degradation of the mechanical properties of the material. The product can be formed by pressureless sintering, letting the purified gas flow, or sintered in vaccuum.

ADVANTAGE OF THE DISCLOSURE

The processing parameters for injection molding, the composition design of binders and ceramic composites, and the techniques for controlling the phase transformation of chromium carbide are developed according to the invention. A near-net shape complex components with a minimum amount of after machining can be manufactured. The injection molding and pressureless sintering process used in this invention also make mass production possible. Optimized properties of 97.8% in the theoretical density, 500 Mpa in strength, and 5.85 Mpam½, are obtained by this invention. These properties are much greater in comparison with the properties of conventional alumina ceramics.

The following are the Figures and Examples which give a detailed description of the purpose and characteristics of this invention.

IMPLEMENTED EXAMPLE 1

1. Powder Equipment:

Add 15.7 grams of chromium carbide into 84.3 grams of alumina to form a mixed powder. Then add 500 grams of anhydrous alcohol. Ball mill 600 grams of alumina ball for 24 hours, dry and sort.

2. Powder and Binding Mixing and Refining:

Put the dried powders together with the binders such as polypropylene, paraffin and stearate into the double blade mixing and refining machine to form solidified suspensions.

3. Injection Molding:

Crush the solidified suspensions into 1–2mm size. Put them in the injection molding feed mouth. Set the temperature heating pipe at 155-150-150° C., injection nozzle temperature at 160° C., injection pressure at 500kg/cm², and injection speed at 40cc/sec., then start injection molding, and injecting near-net shape complex components as shown in FIG. 5.

4. Solvent Degreasing:

Immerse the formed green products in 60° C. normal heptane for 10 hours for degreasing. Cool at room temperature, and then remove.

5. Thermal Degreasing:

After solvent degreasing, put the green products into the heating furnace and heat at 500° C. air temperature. Use the heating-up diagram of curves to control degreasing speed.

6. Cold Isostatic Pressure (CIP) Forming:

Use 100Mpa pressure to CIP form the degreased green products and put these green products in the bake oven for 24 hours. Maintain the temperature at 100°C. to control the residual moisture in the green products.

Figure 1:
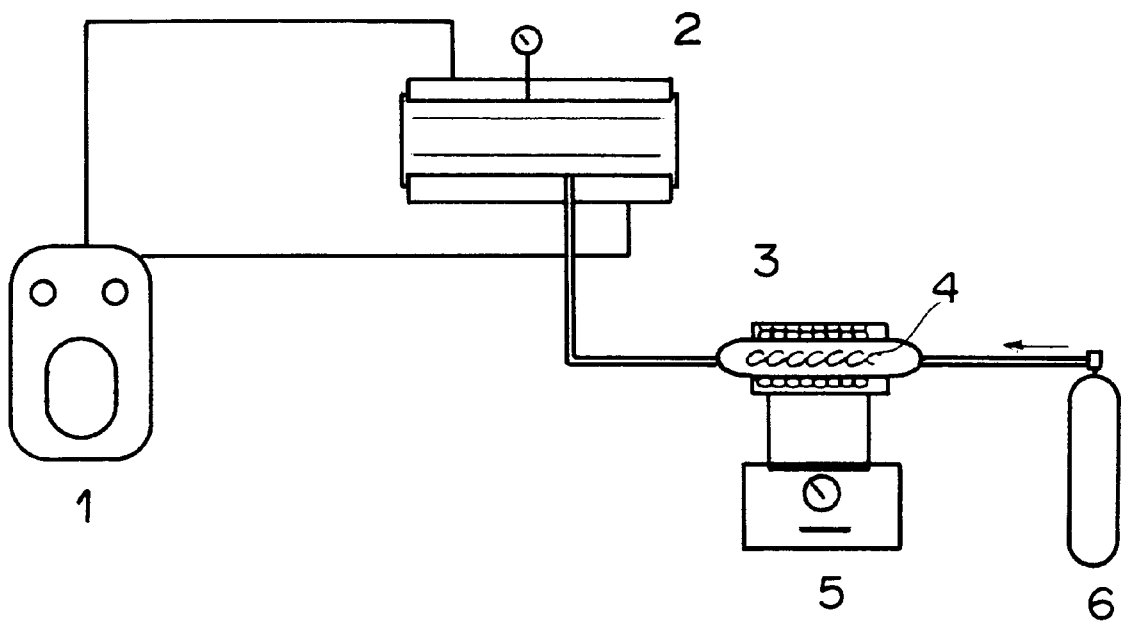
FIG. 1 is a diagram showing a piping layout of a high temperature furnace during pressureless sintering, highly purified argon gas flow is introduced inside the furnace. Pure copper is heated (at approximately 600° C.) through the pipeline inside the furnace so that the minimum residual oxygen passing inside the furnace will react with the heated pure copper and become cupric oxide, hereby, controlling $Cr_3C_2$ to generate oxidation resulting in $Cr_7C_3$ which reduces its mechanical property.

7. Pressureless Sintering:

In order to control the phase transformation of chromium carbide ($Cr_3C_2$) at elevated temperatures, the green products are taken out from the oven and were delivered immediately to the high temperature furnace for sintering, at the same time, letting argon gas flow inside the furnace to perform pressureless sintering. The furnace and piping are as shown in FIG. 1. Its heating-up diagram of curves is shown in FIG. 3. The relative density of the finished product is 97.8%, the strength is approximately 500Mpa, and the toughness is 5.85MPam$^{1/2}$.

IMPLEMENTED EXAMPLE 2

Steps 1–6 are as per Implemented Example 1. Step 7. Vacuum sintering is as follows:

Green products which are taken out from the oven were delivered immediately to the vacuum sintering furnace for sintering in order to control phase transformation of chromium carbide at elevated temperatures. Heating-up diagram of curves is as shown in FIG. 3. The relative density of the finished product is 98%, the strength is approximately 530MPa, and the toughness is 5.4MPam$^{1/2}$.

The above implemented examples are not being used to limit the claims of this invention. All the composition of materials, operating conditions, and processing steps similar to this study are included in the claims of this invention.

TABLE 1

| | component relative density (%) | | | |
|---|---|---|---|---|
| sintering temperature °C. | 10 vol % $Cr_3C_2/Al_2O_3$ | 20 vol % $Cr_3C_2/Al_2O_3$ | 30 vol % $Cr_3C_2/Al_2O_3$ | 40 vol % $Cr_3C_2/Al_2O_3$ |
| 1400 | 85.0 | 83.0 | 81.3 | 78.6 |
| 1550 | 98.7 | 87.0 | 94.5 | 91.3 |
| 1700 | 97.5 | 96.3 | 93.0 | 92.5 |

TABLE 2

| | component flexural strength (MPa) | | | | |
|---|---|---|---|---|---|
| $Cr_3C_2$ particle size | $Al_2O_3$ | 10 vol % $Cr_3C_2/Al_2O_3$ | 20 vol % $Cr_3C_2/Al_2O_3$ | 30 vol % $Cr_3C_2/Al_2O_3$ | 40 vol % $Cr_3C_2/Al_2O_3$ |
| 2 μm | 310 | 485 | 420 | 370 | 242 |
| 7 μm | 311 | 400 | 348 | 225 | 185 |

TABLE 3

| | component toughness MPa · m½ | | | | |
|---|---|---|---|---|---|
| environment | $Al_2O_3$ | 10 vol % $Cr_3C_2/Al_2O_3$ | 20 vol % $Cr_3C_2/Al_2O_3$ | 30 vol % $Cr_3C_2/Al_2O_3$ | 40 vol % $Cr_3C_2/Al_2O_3$ |
| Ar | 4.0 | 4.7 | 5.2 | 5.9 | 4.7 |
| Vacuum | 3.9 | 4.8 | 5.2 | 6.0 | 5.6 |

What is claimed is:

1. A process for manufacturing a sintered $Cr_3C_2/Al_2O_3$ product comprising:

mixing chromium carbide powder and alumina powder in a ratio of 10:90 to 40:60 respectively to form a mixture;

mixing at least one binder with said mixture to form a solidified suspension;

heating said solidified suspension to render it fluid;

injection molding said heated suspension to form an injection molded product;

degreasing said injection molded product to form a degreased injection molded product by solvent degreasing followed by thermal degreasing;

cold isostatic pressing said degreased injection molded product; and vacuum sintering or pressureless sintering said degreased injection molded product subjected to cold isostatic pressing to form said sintered product.

2. The process defined in claim 1, wherein said at least one binder is a member selected from the group consisting of polypropylene, paraffin, and stearate in a quantity of 55–60 volume % based on said chromium carbide powder and alumina powder.

3. The process defined in claim 1, further comprising forming complex-shaped components, wherein an injection molding machine used in said injection molding step is heated to a temperature of 155-150-150 C., wherein an injection nozzle is heated to a temperature to 160°C., and wherein an injection pressure is 500kg/cm$^2$, and wherein an injection speed is 40cc/sec to form complex-shaped components.

4. The process defined in claim 1, wherein said degreasing step further comprises degreasing with a solvent selected from the group consisting of normal ethane, normal heptane, normal hexane, and normal octane at a temperature of approximately 60° C.

5. The process defined in claim 1, wherein said thermal degreasing step further comprises degreasing at a temperature of 500–600 C., wherein said binder is removed from said injection molded product during sintering forming an even pore distribution in said injection molded product.

6. The process defined in claim 1, wherein said cold isostatic pressing is performed at 100MPa, and wherein internal voids in said injection molded products are minimized and a density of said injection molded products is increased.

* * * * *